US008177163B2

(12) United States Patent
Wilcynski et al.

(10) Patent No.: US 8,177,163 B2
(45) Date of Patent: May 15, 2012

(54) AIRCRAFT VIDEO CONTROL STATION WITH STOWABLE SEAT

(75) Inventors: Paul J. Wilcynski, Seattle, WA (US);
Jeffrey R. Nix, Stanwood, WA (US);
Stephen L. Scown, Edmonds, WA (US);
Mostafa Ghoreishi, Bellevue, WA (US);
Anthony E. Anderson, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 630 days.

(21) Appl. No.: 12/391,880

(22) Filed: Feb. 24, 2009

(65) Prior Publication Data
US 2010/0218225 A1 Aug. 26, 2010

(51) Int. Cl.
*B64D 11/00* (2006.01)
(52) U.S. Cl. .................................................. 244/118.5
(58) Field of Classification Search ............... 244/118.5, 244/118.6
See application file for complete search history.

(56) References Cited

U.S. PATENT DOCUMENTS

| | | | | |
|---|---|---|---|---|
| 5,024,398 A | * | 6/1991 | Riedinger et al. | 244/118.5 |
| 5,687,513 A | * | 11/1997 | Baloga et al. | 52/32 |
| 7,032,523 B2 | * | 4/2006 | Forslund et al. | 108/50.01 |
| 7,262,957 B2 | * | 8/2007 | Doebertin et al. | 361/679.55 |
| 7,364,119 B2 | * | 4/2008 | Sprenger et al. | 244/118.6 |
| 7,934,679 B2 | * | 5/2011 | Bock et al. | 244/118.6 |

OTHER PUBLICATIONS

Image of "15 Inch Stand Up Video Control Station Existing", from Boeing Database Enovia, Boeing Product Development Presentation, Oct. 2008.
Photographs of "38 Inch Sit Down Existing Video Control Station" from "787 Airplane Descriptions and Selections," Boeing Doc 787B1-0227, Rev. J., p. 326, Dec. 2006.
Photograph of "38 Inch Sit Down Video Control Station Existing", from Boeing 777 Airplane fom Boeing Factory in Everett, WA, 1996.
Photograph of "18 Inch Stand Up Video Control Station with Cabinets Existing", from Boeing 777 Airplane Remote Communications .Center from Boeing Factory in Everett. WA, 2006.

* cited by examiner

*Primary Examiner* — Tien Dinh
*Assistant Examiner* — Keith L Dixon

(57) ABSTRACT

The disclosure provides for an aircraft video control station. In an embodiment, the aircraft video control station comprises a wall mounted control panel, a desktop, a seat that is stowed when not in use, and a cabinet that contains the wall mounted control panel, the desktop, and the seat. The cabinet may have a depth in the range of about 10 inches to about 37 inches, and preferably has a depth of 15 inches. The seat may be in the form of a swing out seat.

26 Claims, 11 Drawing Sheets

AIRCRAFT VIDEO CONTROL STATION WITH STOWABLE SEAT

BACKGROUND

1) Field of the Disclosure

The disclosure relates to a video control station, and in particular, to an aircraft video control station.

2) Description of Related Art

Aircraft video control stations for containing and providing in-flight audio and video entertainment to aircraft passengers are known. Known aircraft video control stations include stand up video control stations located near the aircraft passenger door area or areas in which a flight attendant or user stands up to operate the controls and/or video display screen in the video control station. The width of such video control station is typically 15 inches. However, such stand up video control station does not provide a place for the flight attendant or user to sit down, does not utilize the available unused space in the aircraft passenger door areas, and typically only provides a small work surface primarily occupied by a keyboard. In addition, known aircraft video control stations include sit down video control stations located in the cabin of an aircraft. The depth of such sit down video control station is typically 38 inches. However, such sit down video control station can occupy significant cabin space and can reduce the overall cabin space available for passenger seats and passenger amenities. Moreover, many aircraft cannot accommodate such known sit down video control stations due to lack of available cabin space. In addition, such sit down video control stations can increase the weight and load of the aircraft and can be costly to build and install.

Accordingly, there is a need for an aircraft video control station that provides advantages over known stations and systems.

SUMMARY

This need for an aircraft video control station that provides advantages over known stations and systems is satisfied. Unlike known stations or systems, embodiments of the aircraft video control station and method of the disclosure may provide one or more of the following advantages: provides an aircraft video control station having a stowable seat that saves space by being located in or near the aircraft passenger door area or areas, and that saves weight and costs over larger known sit down video control stations; provides an aircraft video control station having a stowable seat that provides sit down capability, workstation capability, and rest area capability for users such as flight attendants, pursers, and flight crew; provides an aircraft video control station having a stowable seat, such as a swing out seat, that can be deployed into an aircraft passenger door area when in use during flight and that can be deployed into a stowed position and stowed away from the aircraft passenger door area when passengers board and disembark the aircraft; provides an aircraft video control station having a wall mounted control panel, a keyboard in one of the embodiments, and a seat portion, preferably a swing out seat, that all fit within a cabinet preferably having a 15 inch depth; provides an aircraft video control station that may use 60% less cabin space by using a passenger door area which is otherwise unused during flight; and, provides an aircraft video control station that may be easily retrofitted into existing aircraft.

In an embodiment of the disclosure, there is provided an aircraft video control station. The aircraft video control station comprises a wall mounted control panel, a desktop, a seat that is stowed when not in use, and a cabinet that contains the wall mounted control panel, the desktop, and the seat. The cabinet may have a depth in the range of about 10 inches to about 37 inches. Preferably, the cabinet has a depth of 15 inches.

In another embodiment of the disclosure, there is provided an aircraft comprising an interior and a video control station in the interior. The video control station comprises a wall mounted control panel, a desktop, a seat that is stowed when not in use, and a cabinet that contains the wall mounted control panel, the desktop, and the seat. The cabinet may have a depth in the range of about 10 inches to about 37 inches. Preferably, the cabinet has a depth of 15 inches.

In another embodiment of the disclosure, there is provided an aircraft video control station having sitting capability for a flight attendant, a purser, or a flight crew member. The aircraft video control station comprises a wall mounted control panel. The wall mounted control panel may comprise a wall mounted display touch screen that is activated by touch or a wall mounted display screen monitor that is used with a video control keyboard positioned on a surface of the desktop. The wall mounted control panel further comprises a plurality of controls. The aircraft video control station further comprises a desktop and a swing out seat that is stowed below the desktop when not in use. The swing out seat deploys out into a passenger door area of the aircraft when in use during flight and deploys into a stowed position below the desktop and is stowed to a side of the passenger door area of the aircraft when passengers board and disembark the aircraft. The swing out seat comprises a rotatable column assembly having a rotatable column, a top attachment portion, a locking mechanism to lock the swing out seat in a stowed position below the desktop, a stop mechanism to stop the swing out seat at a deployed position when the swing out seat is in use, a non-rotatable bottom attachment portion, and a rotatable arm portion. The swing out seat further comprises a seat portion having a back portion, a sitting portion, a padded seat cushion, a retractable lap belt assembly, and side portions. The rotatable column assembly allows rotation of the seat portion relative to the rotatable column assembly. The aircraft video control station further comprises a cabinet that contains the wall mounted control panel, the desktop, and the swing out seat. The cabinet may have a depth in the range of about 10 inches to about 37 inches. Preferably, the cabinet has a depth of 15 inches.

In another embodiment of the disclosure, there is provided a method for controlling a video control station of an aircraft. The method comprises the step of mounting an embodiment of an aircraft video control station in a passenger door area of an aircraft. The aircraft video control station comprises a wall mounted control panel, a desktop, a seat that is stowed when not in use, and a cabinet that contains the wall mounted control panel, the desktop, and the seat. The method further comprises the step of stowing the aircraft video control station in a cabinet having one or more cabinet doors when passengers board the aircraft. The method further comprises the step of opening the one or more cabinet doors. The method further comprises the step of deploying the seat into the passenger door area during flight. The method further comprises the step of deploying the seat away from the passenger door area. The method further comprises the step of stowing the seat. The method further comprises the step of closing the one or more cabinet doors when passengers disembark. The cabinet may have a depth in the range of about 10 inches to about 37 inches. Preferably, the cabinet has a depth of 15 inches.

In another embodiment of the disclosure, there is provided a method for controlling a video control station of an aircraft, the video control station having sitting capability for a flight attendant, a purser, or a flight crew member. The method comprises the step of mounting an embodiment of an aircraft video control station in a passenger door area of an aircraft. The aircraft video control station comprises a wall mounted control panel comprising a wall mounted display touch screen that is activated by touch or a wall mounted display screen monitor, wherein the wall mounted display screen monitor is used with a video control keyboard positioned on a surface of the desktop. The wall mounted control panel further comprises a plurality of controls. The aircraft video control station further comprises a desktop and a swing out seat that is stowed below the desktop when not in use, wherein the swing out seat deploys into a passenger door area of the aircraft when in use during flight and deploys into a stowed position below the desktop and is stowed to a side of the passenger door area of the aircraft when passengers board and disembark the aircraft. The swing out seat comprises a rotatable column assembly comprising a rotatable column, a top attachment portion, a locking mechanism to lock the swing out seat in a stowed position below the desktop, a stop mechanism to stop the swing out seat at a deployed position when the swing out seat is in use, a non-rotatable bottom attachment portion, and a rotatable arm portion. The swing out seat further comprises a seat portion comprising a back portion, a sitting portion, a padded seat cushion, a retractable lap belt assembly, and side portions. The rotatable column assembly allows rotation of the seat portion relative to the rotatable column assembly. The aircraft video control station further comprises a cabinet that contains the wall mounted control panel, the desktop, and the swing out seat, wherein the cabinet has a depth in the range of about 10 inches to about 37 inches. The method further comprises the step of stowing the aircraft video control station in a cabinet having one or more cabinet doors when passengers board the aircraft. The method further comprises the step of opening the one or more cabinet doors. The method further comprises the step of deploying the swing out seat into the passenger door area during flight. The method further comprises the step of deploying the swing out seat away from the passenger door area. The method further comprises the step of stowing the swing out seat. The method further comprises the step of closing the one or more cabinet doors when passengers disembark.

The features, functions, and advantages that have been discussed can be achieved independently in various embodiments of the disclosure or may be combined in yet other embodiments further details of which can be seen with reference to the following description and drawings.

BRIEF DESCRIPTION OF THE DRAWINGS

The disclosure can be better understood with reference to the following detailed description taken in conjunction with the accompanying drawings which illustrate preferred and exemplary embodiments, but which are not necessarily drawn to scale, wherein.

DETAILED DESCRIPTION

Disclosed embodiments will now be described more fully hereinafter with reference to the accompanying drawings, in which some, but not all of the disclosed embodiments are shown. Indeed, several different embodiments may be provided and should not be construed as limited to the embodiments set forth herein. Rather, these embodiments are provided so that this disclosure will be thorough and complete and will fully convey the scope of the disclosure to those skilled in the art.

The disclosure provides for an aircraft video control station with a stowable seat that can be deployed into an aircraft passenger door area during flight and that can be stowed away when passengers board and disembark the aircraft. The aircraft video control station of the disclosed embodiments may be used to contain components for and provide in-flight audio and video entertainment in aircraft such as airplanes (commercial or military), trains, maritime craft such as ships, and other suitable vehicles and craft. Accordingly, one of ordinary skill in the art will recognize and appreciate that the aircraft video control station of the disclosure can be used in any number of applications involving aircraft such as airplanes (commercial or military), trains, maritime craft such as ships, and other suitable vehicles and craft.

Figure 1:
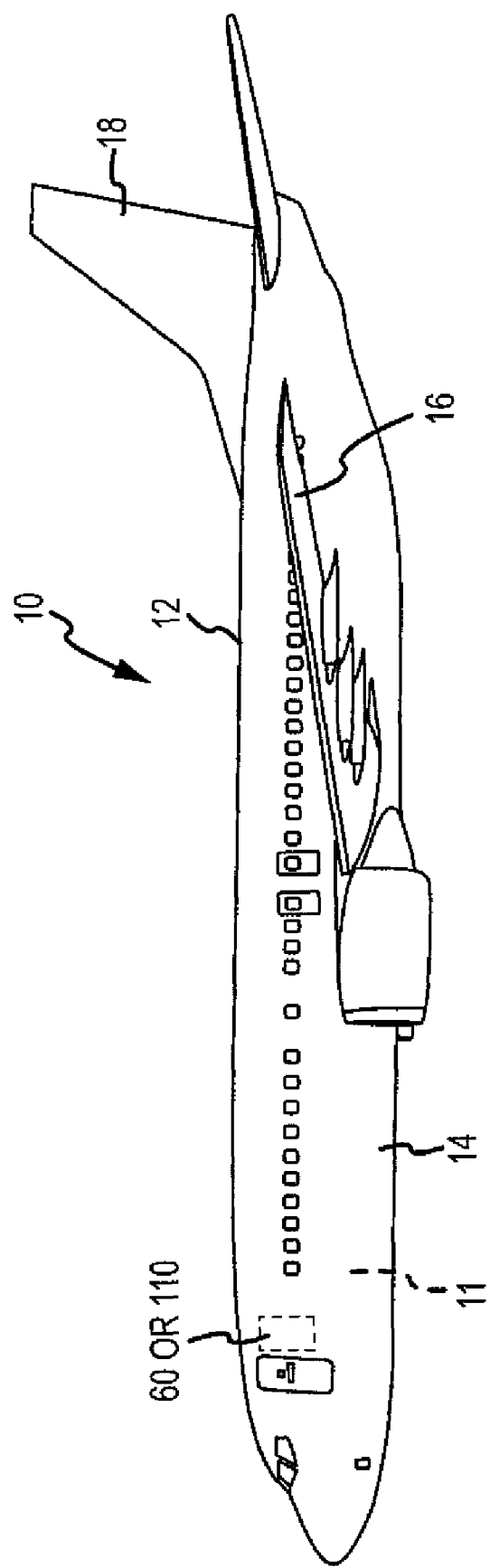
FIG. 1 is an illustration of an aircraft showing the location of embodiments of the aircraft video control station of the disclosure.

Referring more particularly to the drawings, FIG. 1 is an illustration of an aircraft 10 having an interior 11 and showing one location of embodiments of aircraft video control station 60 or 110 of the disclosure, in the interior 11. The aircraft video control station embodiments 60, 110 are discussed in detail below. FIG. 1 shows the aircraft 10 comprising an aircraft structure 12 including an elongated body 14, at least one wing 16 extending laterally from the body 14, and at least one tail 18 extending longitudinally from the body 14.

Figure 2:
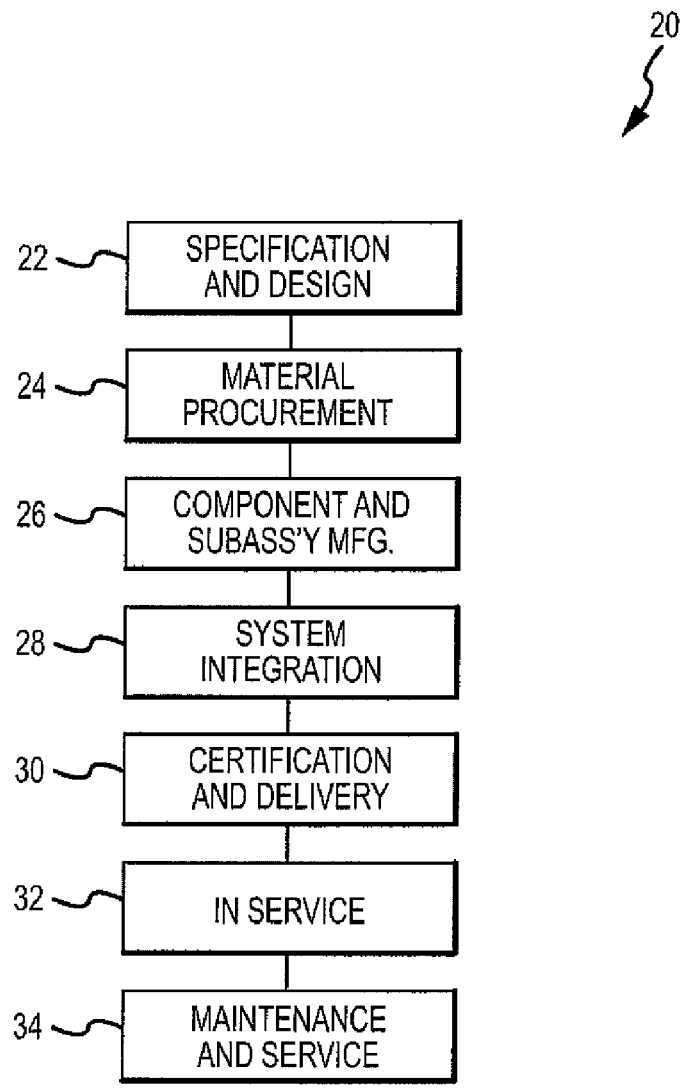
FIG. 2 is an illustration of a flow diagram of aircraft production and service methodology.
Figure 3:
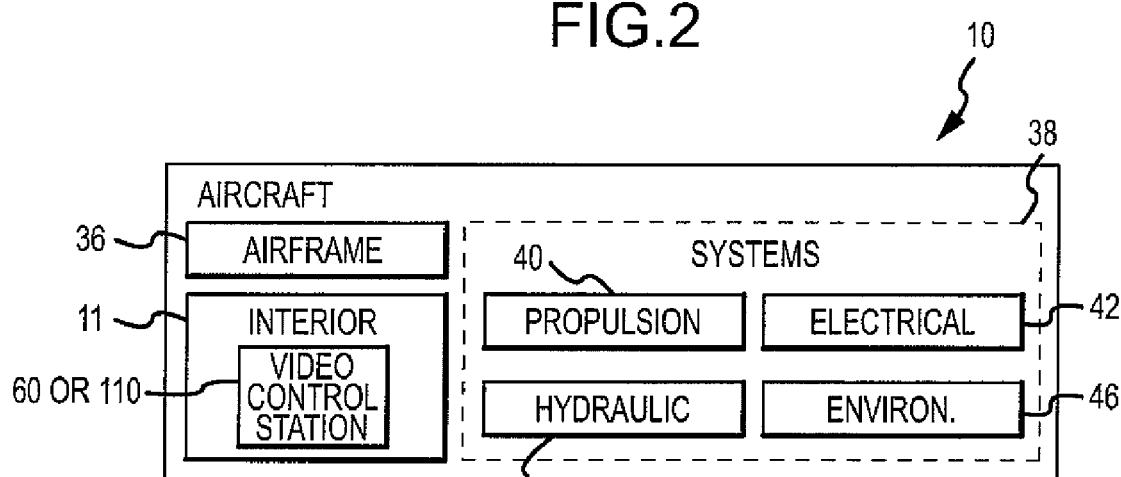
FIG. 3 is an illustration of a block diagram of an aircraft.

FIG. 2 is an illustration of a flow diagram of aircraft production and service methodology. Embodiments of the disclosure may be described in the context of an aircraft manufacturing and service method 20 as shown in FIG. 2 and an aircraft 10 as shown in FIG. 3. During pre-production, exemplary method 20 may include specification and design 22 of the aircraft 10 and material procurement 24. During production, component and subassembly manufacturing 26 and system integration 28 of the aircraft 10 takes place. Thereafter, the aircraft 10 may go through certification and delivery 30 in order to be placed in service 32. While in service by a customer, the aircraft 10 is scheduled for routine maintenance and service 34 (which may also include modification, reconfiguration, refurbishment, and so on).

Each of the processes of method 20 may be performed or carried out by a system integrator, a third party, and/or an operator (e.g., a customer). For the purpose of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

FIG. 3 is an illustration of a block diagram of an aircraft. As shown in FIG. 3, the aircraft 10 produced by exemplary method 20 may include an airframe 36 with a plurality of high-level systems 38 and with interior 11. The interior 11 may include an embodiment of aircraft video control station 60 (see FIG. 4) or may include another embodiment of aircraft video control station 110 (see FIG. 5). Examples of high-level systems 38 include one or more of a propulsion system 40, an electrical system 42, a hydraulic system 44, and an environmental system 46. Any number of other systems may be included. Although an aerospace example is shown, the principles of the invention may be applied to other industries, such as the shipping industry.

Apparatus and methods embodied herein may be employed during any one or more of the stages of the manufacturing and service method 20. For example, components or subassemblies corresponding to component and subassembly manufacturing 26 may be fabricated or manufactured in a manner similar to components or subassemblies produced while the aircraft 10 is in service. Also, one or more apparatus embodiments, method embodiments, or a combination thereof may be utilized during the component and subassembly manufacturing 26 and system integration 28 stages, for example, by substantially expediting assembly of or reducing the cost of an aircraft 10. Similarly, one or more of apparatus embodiments, method embodiments, or a combination thereof may be utilized while the aircraft 10 is in service, for example and without limitation, to maintenance and service 34.

Figure 4:
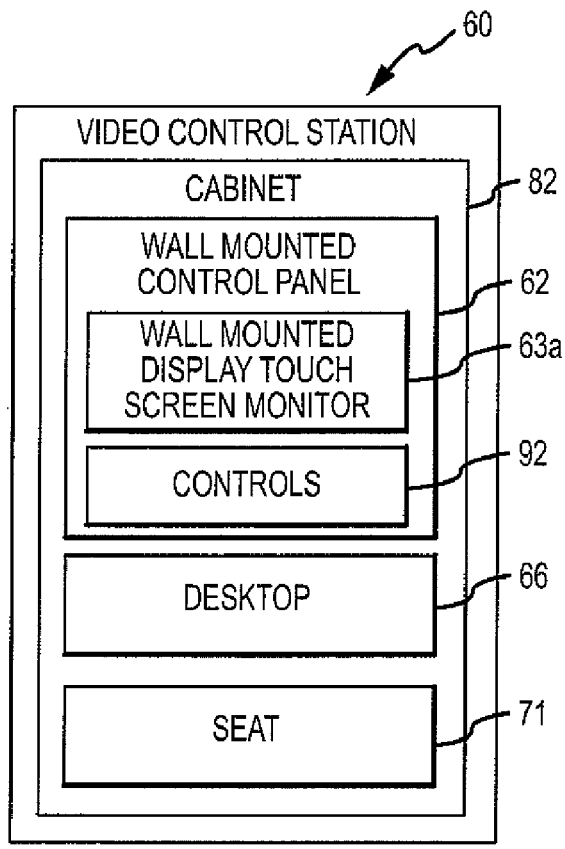
FIG. 4 is an illustration of a block diagram of an embodiment of an aircraft video control station of the disclosure.

FIG. 4 is an illustration of a block diagram of an embodiment of an aircraft video control station 60 of the disclosure. The aircraft video control station 60, as discussed in detail below, comprises a cabinet 82 containing a wall mounted control panel 62 comprising a wall mounted display touch screen monitor 63a and controls 92. The cabinet further contains a desktop 66 and a seat 71, which are additional components of the aircraft video control station 60.

Figure 5:
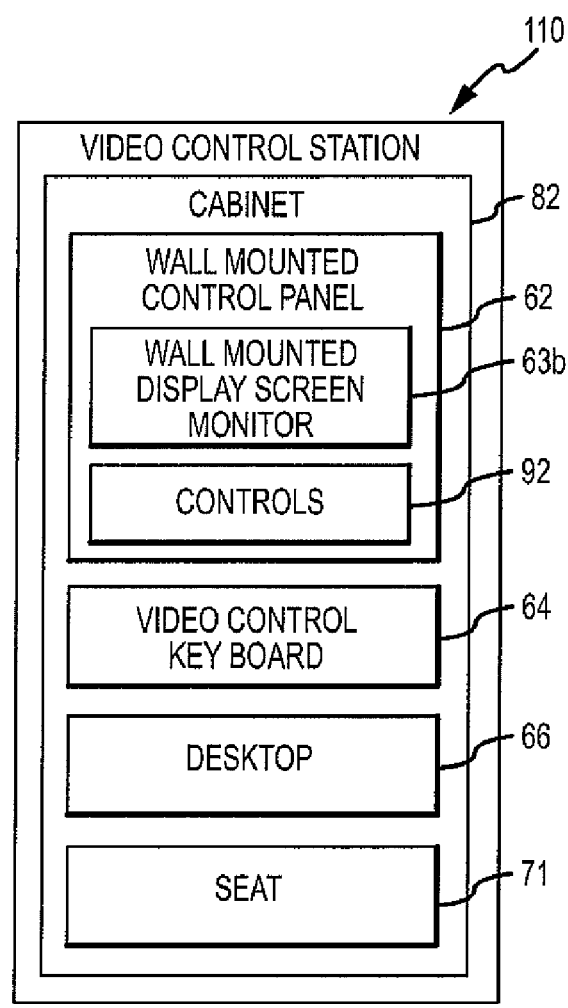
FIG. 5 is an illustration of a block diagram of another embodiment of an aircraft video control station of the disclosure.

FIG. 5 is an illustration of a block diagram of another embodiment of an aircraft video control station 110 of the disclosure. The aircraft video control station 110, as discussed in detail below, comprises a cabinet 82 containing a wall mounted control panel 62 comprising a wall mounted display screen monitor 63b and controls 92. The cabinet further contains a video control keyboard 64, a desktop 66, and a seat 71, which are additional components of the aircraft video control station 110.

Figure 6:
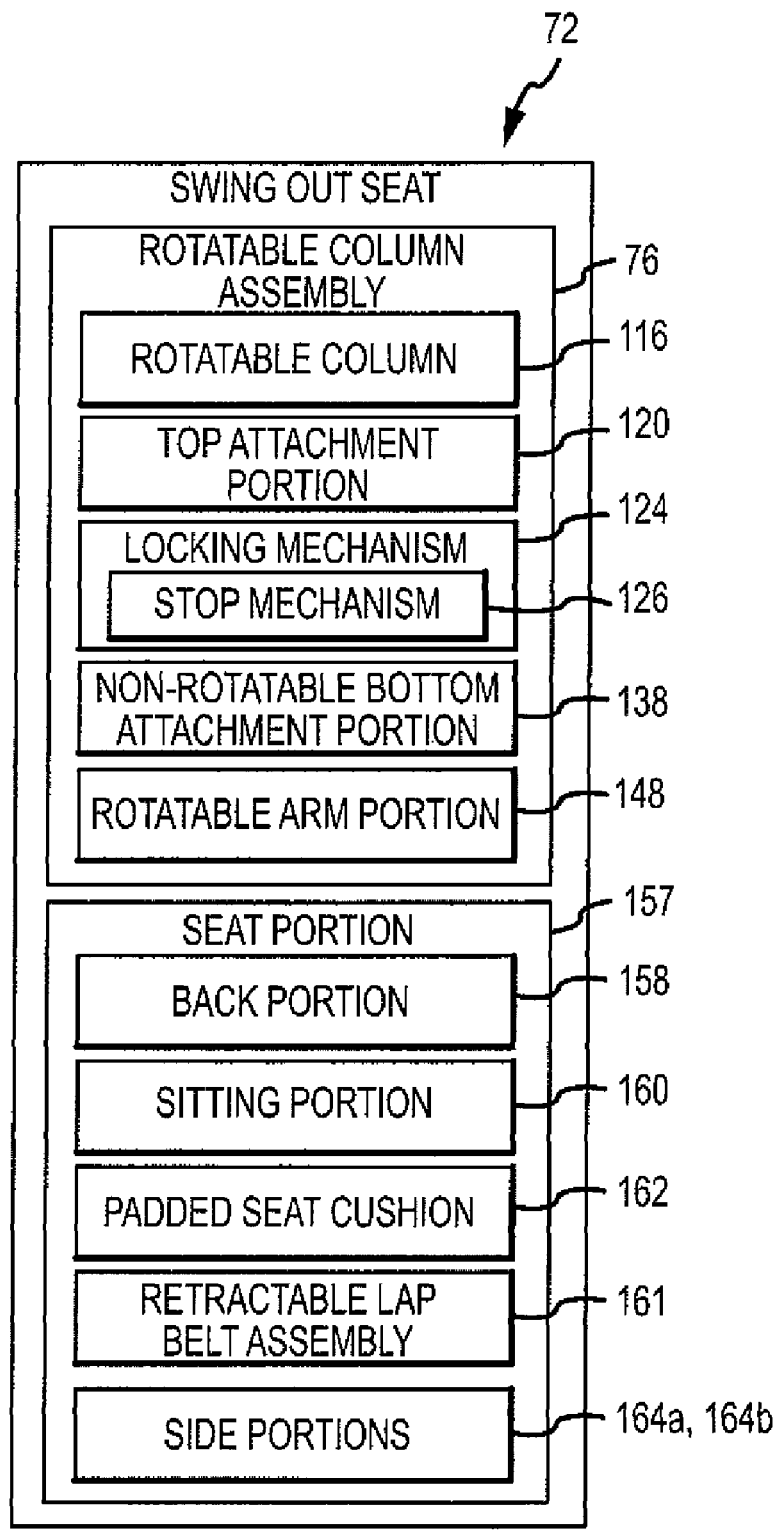
FIG. 6 is an illustration of a block diagram of an embodiment of a swing out seat used with embodiments of the aircraft video control station of the disclosure.

FIG. 6 is an illustration of a block diagram of an embodiment of a swing out seat 72 used with embodiments of the aircraft video control station of the disclosure. The swing out seat 72, as discussed in further detail below, comprises a rotatable column assembly 76. The rotatable column assembly 76 comprises a rotatable column 116, a top attachment portion 120, a locking mechanism 124 with a stop mechanism 126, a non-rotatable bottom attachment portion 138, and a rotatable arm portion 148. The swing out seat 72 further comprises a seat portion 157. The seat portion 157 comprises a back portion 158, a sitting portion 160, a padded seat cushion 162, a retractable lap belt assembly 161, and side portions 164a, 164b.

Figure 7:
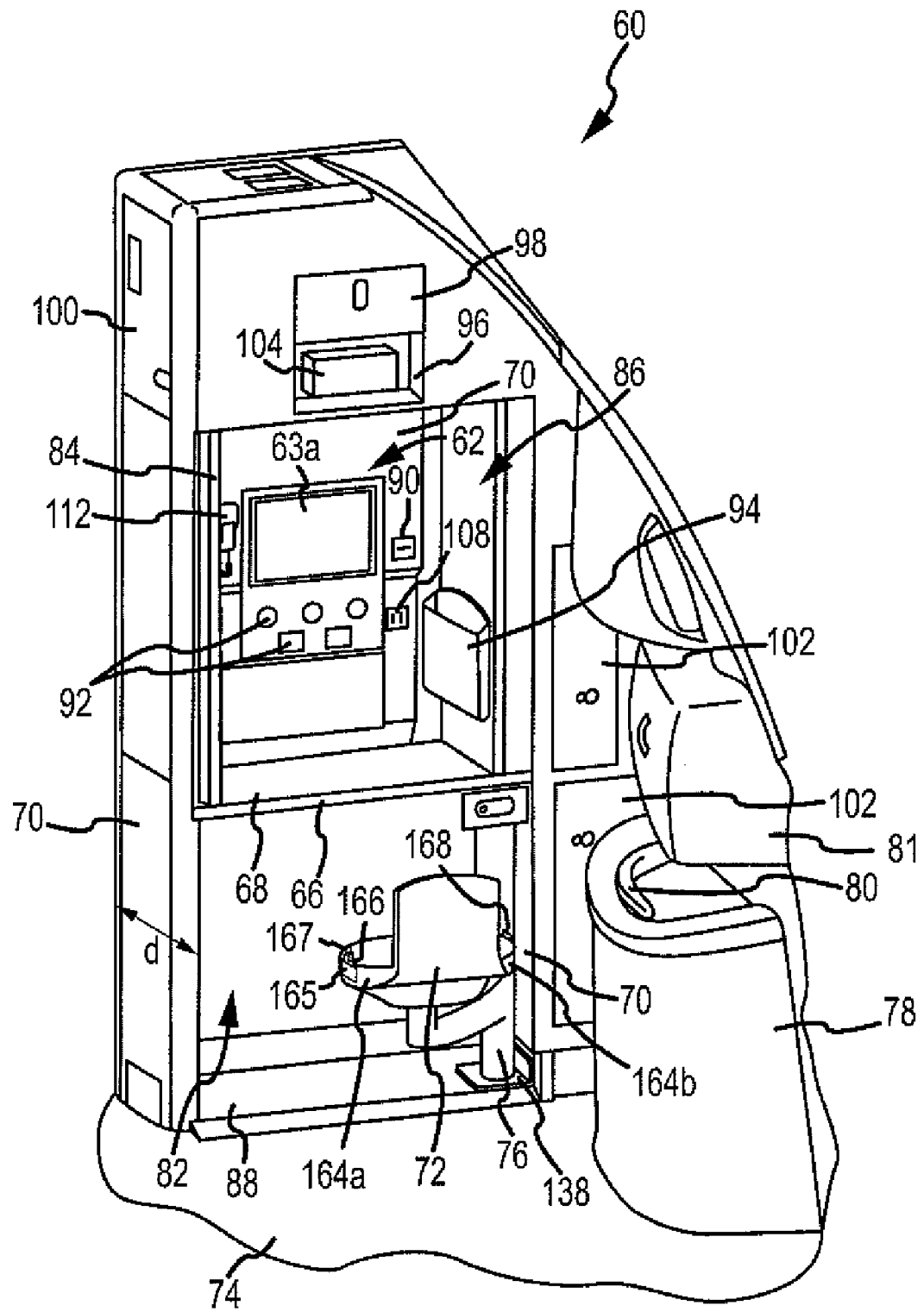
FIG. 7 is an illustration of a front perspective view of an embodiment of an aircraft video control station of the disclosure.
Figure 8:
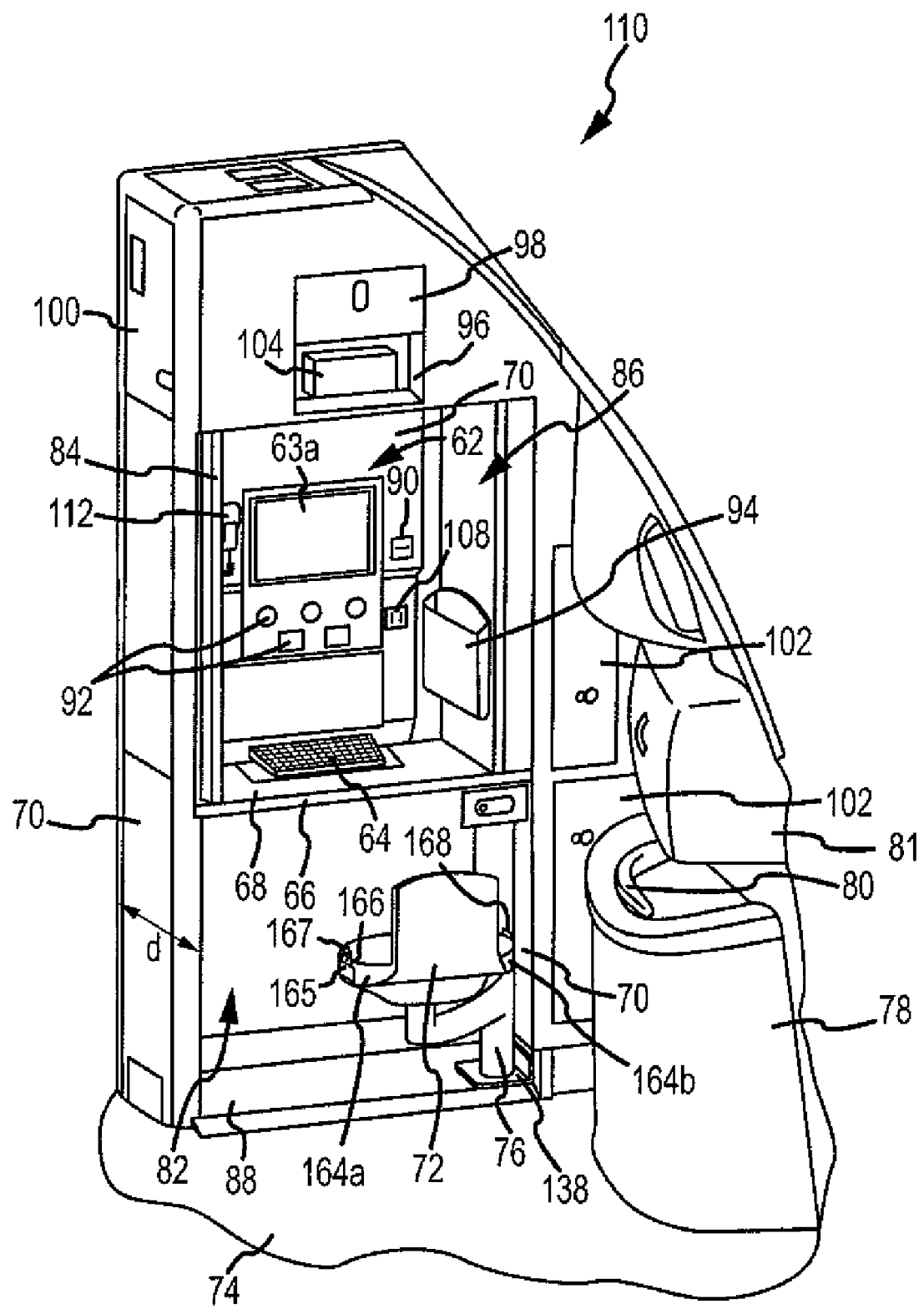
FIG. 8 is an illustration of a front perspective view of another embodiment of an aircraft video control station of the disclosure.
Figure 9:
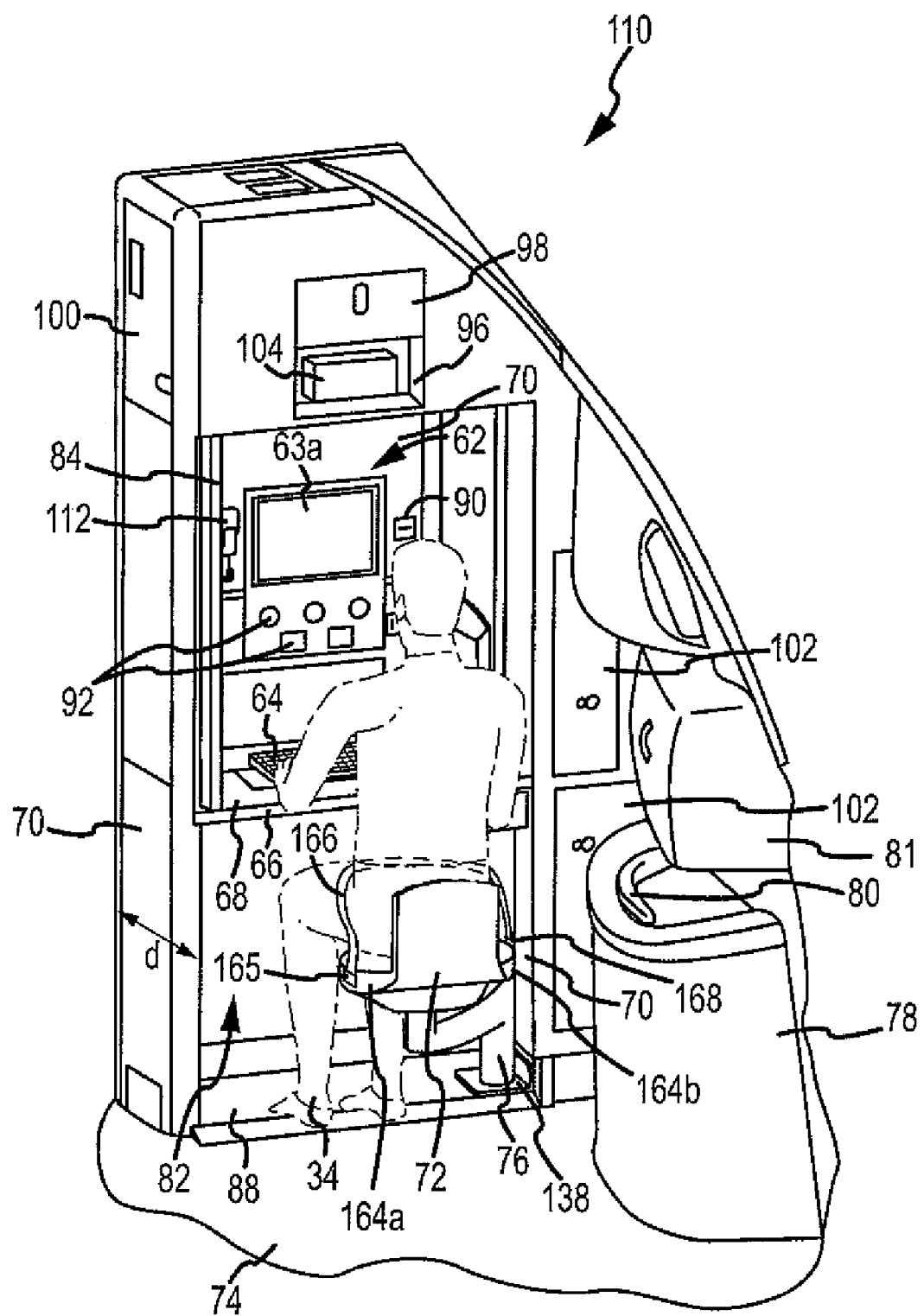
FIG. 9 is an illustration of a front perspective view of the embodiment of FIG. 8 showing a user operating the aircraft video control station.

FIG. 7 is an illustration of a front perspective view of an embodiment of the aircraft video control station 60 of the disclosure. In this embodiment of the disclosure there is provided the aircraft video control station 60 comprising a wall mounted control panel 62. The wall mounted control panel 62 may comprise a wall mounted display touch screen monitor 63a that is activated by touch. In another embodiment of the video control station 110, as shown in FIG. 8, the wall mounted control panel 62 may comprise a wall mounted display screen monitor 63b that is used with a video control keyboard 64. Other suitable wall mounted display screen monitors may also be used. The wall mounted display touch screen monitor 63a or the wall mounted display screen monitor 63b may be, without limitation, a flat screen or another suitable type of screen dimension or shape. The wall mounted control panel 62 may further comprise a plurality of controls 92 such as, without limitation, power switches, and media loaders. The controls 92 may be used to control in-flight entertainment, such as turning on and off a video and audio system (not shown) and operating such components as a digital video disc (DVD) player (not shown), a video cassette recorder (VCR) (not shown), an audio disc player (not shown), or other suitable components. The aircraft video control station 60 further comprises a desktop 66 having a surface 68. The desktop 66 may be integral with walls 70 of the video control station 60. The aircraft video control station 60 further comprises a seat 71 (see FIG. 4). The seat 71 may comprise a swing out seat 72 that may be stowed when not in use, and preferably stowed below the desktop 66 when not in use (see FIG. 10). The swing out seat 72 may be deployed into a passenger door area 74 of the aircraft 10 when in use during flight. The deployment operation may comprise rotating the swing out seat into the passenger door area 74 or another suitable deployment operation. The swing out seat 72 may be deployed into a stowed position 75 below the desktop 66 and may be stowed to a side 77 of the passenger door area 74 (see FIG. 10) of the aircraft 10 when passengers board and disembark the aircraft 10. The deployment operation may comprise rotating the swing out seat into the stowed position 75 or another suitable deployment operation. The swing out seat 72 has a seat portion 157 (see FIG. 12) that may be attached to a rotatable column assembly 76 that allows for the rotation or deployment of the seat portion 157 relative to the rotatable column assembly 76. The seat portion 157 may comprise a retractable lap belt holder 165 (see FIGS. 7-9), a retractable lap belt 166 having a male connector portion 167, and a female connector portion 168. The swing out seat 72 is discussed in detail below in connection with FIG. 12. The aircraft video control station 60 is preferably located near an aircraft passenger door 78. The aircraft passenger door 78 has a handle 80 for opening and closing the passenger door 78. The aircraft passenger door 78 may comprise the front entryway passenger door 81 of the aircraft or other suitable passenger doors (not shown) located on the aircraft 10. The aircraft video control station 60 further comprises a cabinet 82 that contains the wall mounted control panel 62, the desktop 66, and the seat 71, preferably the swing out seat 72. The cabinet 82 may have a depth (d) in the range of about 10 inches to about 37 inches. Preferably, the depth is 15 inches. However, the cabinet may be of another suitable depth or size depending on the size of the aircraft 10. The swing out seat 72 is preferably optimized to be fully contained within the depth of the cabinet 82, preferably a 15 inch depth, when the swing out seat 72 is in the stowed position 75 (see FIG. 10). The cabinet 82 may have one or more cabinet doors 84 that open and close to allow a user to display or conceal at least a portion of an interior 86 of the video control station 60. The cabinet doors 84 may comprise without limitation shutter-type doors, sliding doors, accordion doors, or other suitable doors. The aircraft video control station 60 may further comprise a floor portion 88. The aircraft video control station 60 may further comprise a credit card reader 90. The credit card reader 90 may be integrated into the video control station 60, as shown in FIGS. 7-9, or the credit card reader 90 may be separate and stand-alone (not shown). The aircraft video control station 60 may further comprise a holder element 94 for holding papers or other objects, one or more upper storage compartments 96 having a door 98, one or more side storage compartments 100, and one or more lower storage compartments 102. The aircraft video control station 60 may further comprise a printer 104 that may be housed in the upper storage compartment 96, one or more cabinet lights 106 (see FIG. 11), one or more power connectors 108 such as outlets and ports, and a handset 112. The aircraft video control station 60 may further contain other optional components and devices, including but not limited to, additional storage compartments.

Figure 10:
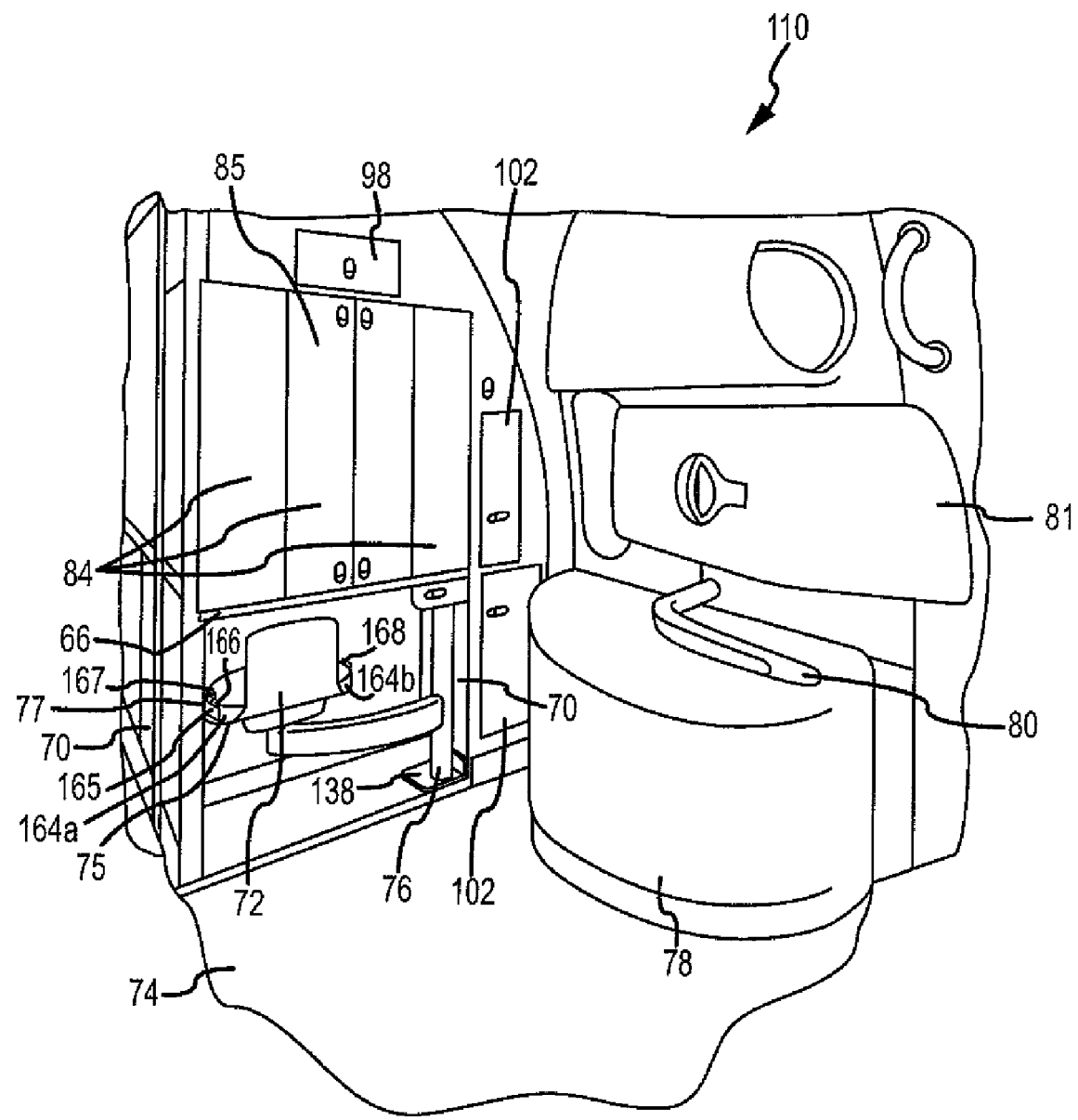
FIG. 10 is an illustration of a front perspective view of an embodiment of an aircraft video control station in a closed and stowed position.
Figure 11:
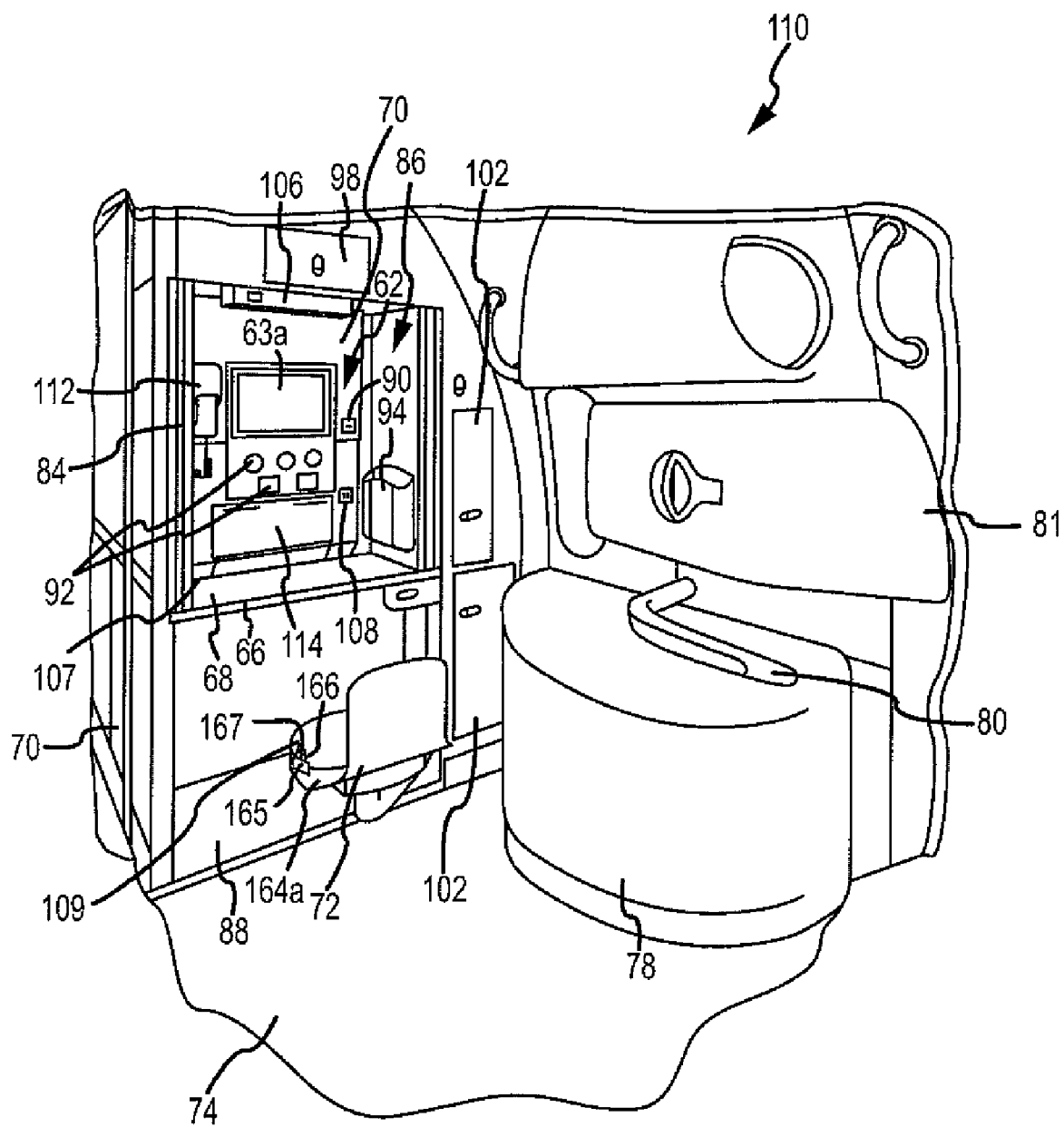
FIG. 11 is an illustration of a front perspective view of the embodiment of FIG. 10 showing the aircraft video control station in an open and deployed position.

FIG. 8 is an illustration of a front perspective view of another embodiment of an aircraft video control station 110 of the disclosure. In this embodiment of the aircraft video control station 110, the wall mounted control panel 62 comprises the wall mounted display screen monitor 63b that is used in conjunction with the video control keyboard 64 positioned on the surface 68 of the desktop 66. The wall mounted control panel 62 further comprises a plurality of controls 92. This embodiment of the aircraft video control station 110 is similar to the aircraft video control station 60 as discussed in connection with FIG. 7 above. This embodiment comprises the seat 71 (see FIG. 5), preferably in the form of swing out seat 72, that is stowed preferably below the desktop 66, when not in use, and the cabinet 82 that contains the wall mounted control panel 62, the desktop 66, and the swing out seat 72. The cabinet 82 may have a depth in the range of about 10 inches to about 37 inches. Preferably, the depth is 15 inches. However, the cabinet may be of another suitable depth or size depending on the size of the aircraft 10. FIG. 9 is an illustration of a front perspective view of the embodiment of FIG. 8 showing user 34 operating the aircraft video control station 110. FIG. 10 is an illustration of a front perspective view showing the cabinet doors 84 of the aircraft video control station 110 in a closed position 85 and the swing out seat 72 in the stowed position 75. In the closed position 85, the cabinet doors 84 may be closed, and in the stowed position 75, the swing out seat 72 may be deployed into the stowed position 75 below the desktop 66 and may be stowed to the side 77 of the passenger door area 74 of the aircraft 10 when passengers board and disembark the aircraft 10. FIG. 11 is an illustration of a front perspective view of the embodiment of FIG. 10 showing the aircraft video control station 110 with the cabinet doors 84 in an open position 107 and the swing out seat 72 in a deployed position 109. In the open position 107, the cabinet doors 84 may be opened, and in the deployed position 109, the swing out seat 72 may be deployed into the passenger door area 74 of the aircraft 10 when in use during flight. As shown in FIG. 11, the aircraft video control station 110 comprises handset 112 and a fold-out keyboard panel door 114 for storing the video control keyboard 64 (FIG. 8) in a stowed position within the video control station 110.

Figure 12:
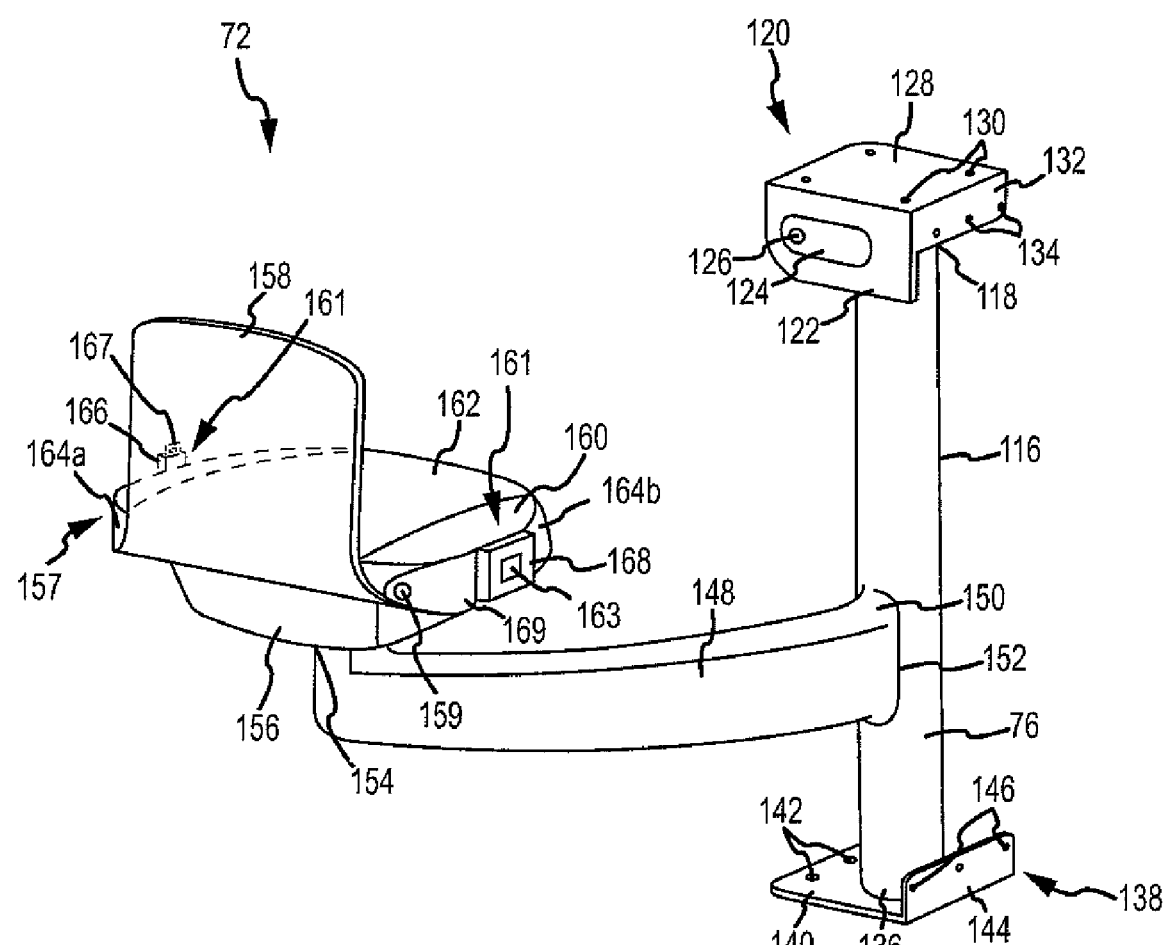
FIG. 12 is an illustration of a front perspective view of an embodiment of a swing out seat of an aircraft video control station embodiment of the disclosure; and, FIG. 13 is an illustration of a flow diagram of the steps of an embodiment of the method of the disclosure.

FIG. 12 is an illustration of a front perspective view of an embodiment of the swing out seat 72 of the embodiments of the aircraft video control station of the disclosure. The swing out seat 72 may comprise the rotatable column assembly 76. The rotatable column assembly 76 may comprise a rotatable column 116, a top attachment portion 120, a locking mechanism 124 having a stop mechanism 126, a non-rotatable bottom attachment portion 138, and a rotatable arm portion 148. The rotatable column 116 has a top end 118 attached to the non-rotatable top attachment portion 120. The rotatable column 116 may be made of cast aluminum or another suitable material. The top attachment portion 120 may comprise a front vertical panel 122. The locking mechanism 124 may be positioned on the front vertical panel 122. When a user depresses or pushes the locking mechanism 124, the locking mechanism 124 locks the swing out seat 72 in the stowed position 75 below the desktop 66 (see FIG. 10). The locking mechanism 124 may have a stop mechanism 126 incorporated into the locking mechanism 124. When the swing out seat 72 is deployed from the stowed position 75, the stop mechanism 126 stops the swing out seat 72 at the deployed position 109, so that the swing out seat 72 does not contact the passenger door 78 (see FIG. 11). Preferably, the swing out seat 72 may be repositionable over a range of about 70 degrees from the stowed position 75. However, the swing out seat 72 may be repositionable over other suitable ranges from the stowed position 75, depending on the aircraft 10 (see FIG. 3) or vehicle used and the location of the swing out seat 72 relative to the passenger door 78. The swing out seat 72 may rotate between the stowed position 75 and the deployed position 109. The top attachment portion 120 may further comprise a top panel 128 having fastener portions 130 for attachment to the bottom of the desktop 66 (see FIG. 8). The top attachment portion 120 further comprises a top attachment side vertical panel 132 having fastener portions 134 for attachment to the wall 70 (see FIG. 10) of the video control station. The top panel 128 and top attachment side vertical panel 132 may be made of metal or another suitable material. The rotatable column 116 may further comprise a bottom end 136 attached to the non-rotatable bottom attachment portion 138. The bottom attachment portion 138 may comprise a bottom panel 140 having fastener portions 142 for attachment to the floor 88 (see FIG. 7) of the video control station. The bottom attachment portion 138 may further comprise a bottom attachment side vertical panel 144 having fasteners portions 146 for attachment to the wall 70 (see FIG. 7) of the video control station. The bottom panel 140 and bottom attachment side vertical panel 144 may be made of metal or another suitable material. The rotatable column assembly 76 may further comprise a rotatable arm portion 148 having a first end 150 attached to rotatable column 116 at attachment portion 152 and a second end 154 attached to a bottom portion 156 of swing out seat 72. The rotatable arm portion 148 may be made of cast aluminum or another suitable material. The swing out seat 72 may further comprise a seat portion 157. The seat portion 157 may comprise a back portion 158, a sitting portion 160 preferably having a padded seat cushion 162, side portions 164a, 164b, and a retractable lap belt assembly 161. The retractable lap belt assembly 161 may comprise a retractable lap belt holder 165 (see FIGS. 7-9) coupled to side 164a. The retractable lap belt holder 165 (see FIGS. 7-9) holds or contains a retractable lap belt 166. The retractable lap belt 166 (see FIG. 9) may be made of cloth, a webbed material, or another suitable material. FIG. 9 shows the retractable lap belt 166 in use around the lap of the user 34.

The retractable lap belt 166 may have a male connector portion 167. The male connector portion 167 may be in the configuration of a tongue portion or another suitable configuration. The retractable lap belt assembly 161 further comprises a female connector holder 169 coupled to side 164b. The female connector holder 169 holds or is coupled to a female connector portion 168. The female connector portion 168 may be in the configuration of a buckle or another suitable configuration. The male connector portion 167 may be inserted into side opening (not shown) of the female connector portion 168 when connecting and using the retractable lap belt 166. The retractable lap belt assembly 161 may further comprise a lap belt button 163 which may be positioned on or integral with the female connector portion 168. The retractable lap belt 166 may be released or retracted by the user depressing or pushing the lap belt button 163. The retractable lap belt assembly 161 may further comprise pivot portion 159 that allows for adjustment of the retractable lap belt 166 when the male connector portion 167 is connected to the female connector portion 168, such that the female connector portion 168 and the female connector holder 169 may be pivoted upwardly to adjust the retractable lap belt 166. The seat portion 157 of the swing out seat 72 may also have the ability to swivel when a user sits on the swing out seat 72. The seat portion 157, except for the padded seat cushion 162 and the retractable lap belt 166, may be made of cast aluminum or another suitable material. The swing out seat 72 is designed to have sufficient friction between the seat portion 157 and the rotatable column assembly 76 to prevent the seat portion 157 from moving if it is not occupied by a user and if the swing out seat 72 is not in the stowed position 75. Such movement may be caused by flight loads, passengers passing by, slight turbulence, or other movements. In addition to the swing out seat 72 configuration as shown in FIG. 12, other suitable seat configurations may be possible, including without limitation, a fold out seat configuration (not shown), a slideout seat configuration (not shown), a rotating seat configuration (not shown), a folded chair or stool (not shown), or another suitable seat configuration.

As shown in FIG. 1, in an embodiment of the disclosure, there is provided aircraft 10 having interior 11. The interior 11 may include embodiments of aircraft video control station 60, 110 of the disclosure as discussed above. The aircraft comprises aircraft structure 12 including elongated body 14, at least one wing 16 extending laterally from the body, at least one tail 18 extending longitudinally from the body, and video control station 60 (see FIG. 7). Alternatively, the aircraft may include video control station 110 (see FIG. 8). The video control station 60 and video control station 110 were both discussed in detail above. The cabinet 82 of the aircraft video control station 60, 110 may have a depth in the range of about 10 inches to about 37 inches. Preferably, the cabinet has a depth of 15 inches. However, the cabinet 82 may be of another suitable depth or size depending on the size of the aircraft 10.

Figure 13:
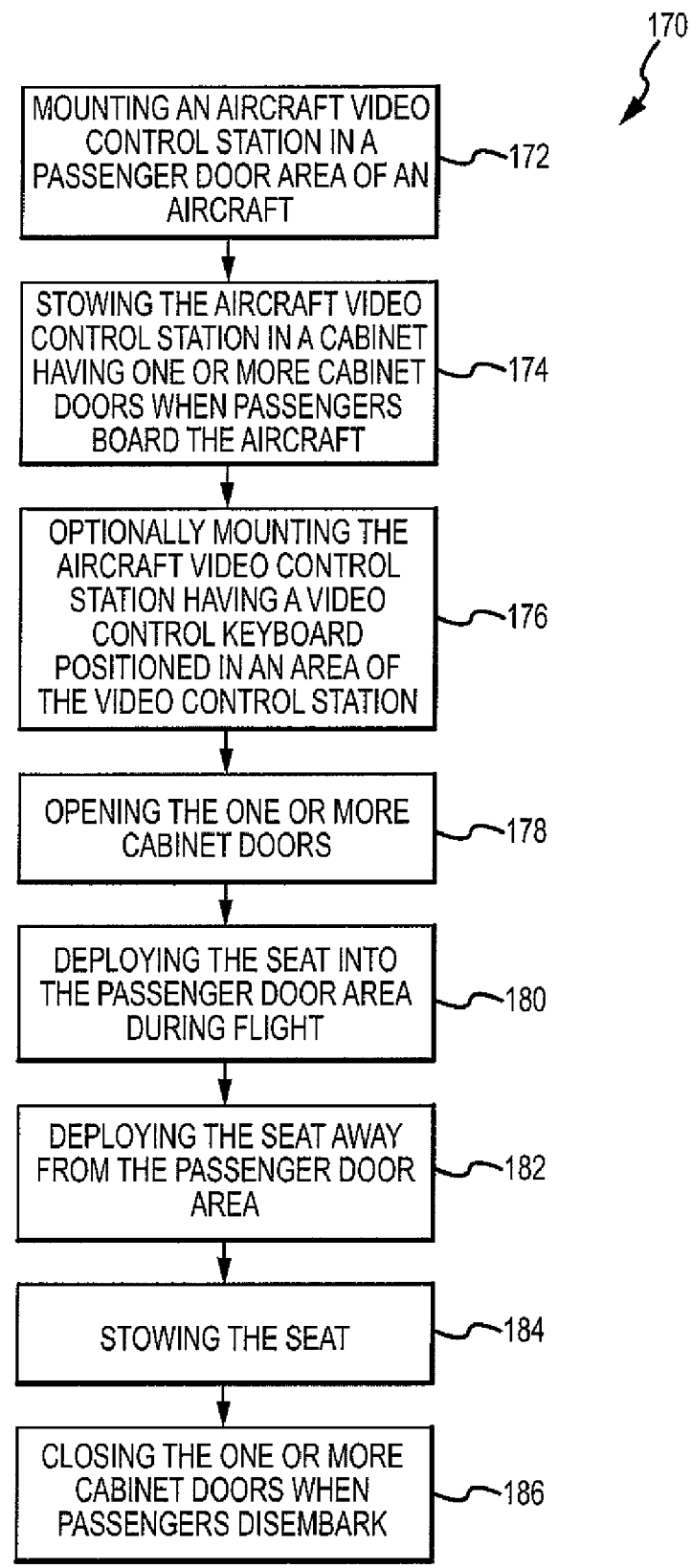

FIG. 13 is an illustration of a block flow diagram of the steps of an embodiment of a method 170 of the disclosure. In this embodiment of the disclosure, there is provided a method 170 for controlling a video control station of an aircraft. The method comprises step 172 of mounting an embodiment of an aircraft video control station 60 (FIG. 7), or alternatively, aircraft video control station 110 (FIG. 8), both of which were discussed in detail above, in or near a passenger door area 74 (see FIGS. 7 and 8) of an aircraft 10. The method further comprises step 174 of stowing the aircraft video control station 60 or 110 in a cabinet 82 having one or more cabinet doors 84 (see FIG. 10) when passengers board the aircraft 10. Optionally, the method may comprise step 176 of mounting the aircraft video control station 110 having a video control keyboard 64 positioned in an area of the video control station, preferably on the surface 68 of desktop 66 (see FIG. 8). The method further comprises step 178 of opening the one or more cabinet doors 84. The method further comprises step 180 of deploying the seat 71, preferably the swing out seat 72 (see FIG. 7) into the passenger door area 74 during flight. The deploying step 180 may comprise rotating the seat or another suitable deploying operation. The method further comprises step 182 of deploying the seat 71, preferably the swing out seat 72, away from the passenger door area 74. The deploying step 182 may comprise rotating the seat or another suitable deploying operation. The method further comprises step 184 of stowing the seat 71, preferably the swing out seat 72. The method further comprises step 186 of closing the one or more cabinet doors 84 when passengers disembark.

Many modifications and other embodiments of the disclosure will come to mind to one skilled in the art to which this disclosure pertains having the benefit of the teachings presented in the foregoing descriptions and the associated drawings. The embodiments described herein are meant to be illustrative and are not intended to be limiting. Although specific terms are employed herein, they are used in a generic and descriptive sense only and not for purposes of limitation.

What is claimed is:

1. An aircraft video control station comprising:
a wall mounted control panel in an interior of an aircraft; and,
a cabinet that contains the wall mounted control panel, a desktop, a swing out seat, and a rotatable column assembly fully enclosed within the cabinet;
wherein the swing out seat is securely attached to the cabinet and is stowed when not in use and includes a seat portion attached to the rotatable column assembly;
and wherein the rotatable column assembly is securely attached below the desktop and further comprises a rotatable arm portion having a first end attached to the rotatable column assembly and a second end attached to the swing out seat.

2. The aircraft video control station of claim 1 wherein the wall mounted control panel comprises a wall mounted display touch screen that is activated by touch, and the wall mounted control panel further comprises a plurality of controls.

3. The aircraft video control station of claim 1 wherein the wall mounted control panel comprises a wall mounted display screen monitor that is used with a video control keyboard positioned on a surface of the desktop, and the wall mounted control panel further comprises a plurality of controls.

4. The aircraft video control station of claim 1 wherein the swing out seat deploys into a passenger door area of the aircraft when in use during flight, and deploys into a stowed position below the desktop and is stowed to a side of the passenger door area of the aircraft when passengers board and disembark the aircraft.

5. The aircraft video control station of claim 1 wherein the swing out seat has a locking mechanism to lock the swing out seat in a stowed position below the desktop, and wherein the swing out seat has a stop mechanism to stop the swing out seat at a deployed position when the swing out seat is in use.

6. The aircraft video control station of claim 1 wherein the rotatable column assembly allows rotation of the seat portion relative to the rotatable column assembly.

7. The aircraft video control station of claim 1 wherein the swing out seat has a retractable lap belt assembly and a padded seat cushion.

8. The aircraft video control station of claim 1 wherein the swing out seat is stowed below the desktop when not in use.

9. The aircraft video control station of claim 1 wherein the cabinet has a depth in the range of about 10 inches to about 37 inches.

10. The aircraft video control station of claim 9 wherein the cabinet has a depth of 15 inches.

11. An aircraft comprising:
a video control station in an interior of the aircraft, the video control station including a wall mounted control panel; and,
a cabinet that contains the wall mounted control panel, a desktop, a swing out seat, and a rotatable column assembly fully enclosed within the cabinet;
wherein the swing out seat is securely attached to the cabinet and is stowed when not in use and includes a seat portion attached to the rotatable column assembly;
and wherein the rotatable column assembly is securely attached below the desktop and further comprises a rotatable arm portion having a first end attached to the rotatable column assembly and a second end attached to the swing out seat.

12. The aircraft of claim 11 wherein the wall mounted control panel comprises a wall mounted display touch screen that is activated by touch, and the wall mounted control panel further comprises a plurality of controls.

13. The aircraft of claim 11 wherein the wall mounted control panel comprises a wall mounted display screen monitor that is used with a video control keyboard positioned on a surface of the desktop, and the wall mounted control panel further comprises a plurality of controls.

14. The aircraft of claim 11 wherein the swing out seat deploys into a passenger door area of the aircraft when in use during flight, and deploys into a stowed position below the desktop and is stowed to a side of the passenger door area of the aircraft when passengers board and disembark the aircraft.

15. The aircraft of claim 11 wherein the swing out seat has a locking mechanism to lock the swing out seat in a stowed position below the desktop, and wherein the swing out seat has a stop mechanism to stop the swing out seat at a deployed position when the swing out seat is in use.

16. The aircraft of claim 11 wherein the rotatable column assembly allows rotation of the seat portion relative to the rotatable column assembly.

17. The aircraft of claim 11 wherein the swing out seat has a retractable lap belt assembly and a padded seat cushion.

18. The aircraft of claim 11 wherein the swing out seat is stowed below the desktop when not in use.

19. The aircraft of claim 11 wherein the cabinet has a depth in the range of about 10 inches to about 37 inches.

20. The aircraft of claim 19 wherein the cabinet has a depth of 15 inches.

21. An aircraft video control station having sitting capability for a flight attendant, a purser, or a flight crew member, the aircraft video control station comprising:
a wall mounted control panel in an interior of an aircraft comprising a wall mounted display touch screen that is activated by touch, or a wall mounted display screen monitor, wherein the wall mounted display screen monitor is used with a video control keyboard positioned on a surface of the desktop, and further wherein the wall mounted control panel comprises a plurality of controls; and,
a cabinet that contains the wall mounted control panel, a desktop, a swing out seat, and a rotatable column assembly fully enclosed within the cabinet;
wherein the swing out seat is securely attached to the cabinet and is stowed when not in use and includes a seat portion attached to the rotatable column assembly;
and wherein the rotatable column assembly is securely attached below the desktop and further comprises a rotatable arm portion having a first end attached to the rotatable column assembly and a second end attached to the swing out seat;
the swing out seat being stowed below the desktop when not in use and being deployed into a passenger door area of the aircraft when in use during flight and into a stowed position below the desktop and stowed to a side of the passenger door area of the aircraft when passengers board and disembark the aircraft, and further wherein the swing out seat comprises:
a locking mechanism to lock the swing out seat in a stowed position below the desktop and a stop mechanism to stop the swing out seat at a deployed position when the swing out seat is in use; and,
a seat portion comprising a back portion, a sitting portion, a padded seat cushion, a retractable lap belt assembly, and side portions.

22. The aircraft video control station of claim 21 wherein the cabinet has a depth of 15 inches.

23. A method for controlling a video control station of an aircraft comprising the steps of:
mounting an aircraft video control station in a passenger door area of an aircraft, the video control station comprising:
a wall mounted control panel; and,
a cabinet that contains the wall mounted control panel, a desktop, a swing out seat, and a rotatable column assembly fully enclosed within the cabinet;
wherein the swing out seat is securely attached to the cabinet and is stowed when not in use and includes a seat portion attached to the rotatable column assembly;
and wherein the rotatable column assembly is securely attached below the desktop and further comprises a rotatable arm portion having a first end attached to the rotatable column assembly and a second end attached to the swing out seat.
stowing the aircraft video control station in the cabinet having one or more cabinet doors when passengers board the aircraft;
opening the one or more cabinet doors;
deploying the swing out seat into the passenger door area during flight;
deploying the swing out seat away from the passenger door area;
stowing the swing out seat; and,
closing the one or more cabinet doors when passengers disembark.

24. The method of claim 23 wherein the cabinet has a depth in the range of about 10 inches to about 37 inches.

25. The method of claim 24 wherein the cabinet has a depth of 15 inches.

26. A method for controlling a video control station of an aircraft, the video control station having sitting capability for a flight attendant, a purser, or a flight crew member, the method comprising the steps of:
mounting an aircraft video control station in a passenger door area of an aircraft, the aircraft video control station comprising:
a wall mounted control panel comprising a wall mounted display touch screen that is activated by touch, or a wall mounted display screen monitor, wherein the wall mounted display screen monitor is used with a video control keyboard positioned on a surface of a desktop, and further wherein the wall mounted control panel comprises a plurality of controls;

a cabinet that contains the wall mounted control panel, the desktop, a swing out seat, and a rotatable column assembly fully enclosed within the cabinet;

wherein the swing out seat is securely attached to the cabinet and is stowed when not in use and includes a seat portion attached to the rotatable column assembly;

and wherein the rotatable column assembly is securely attached below the desktop and further comprises a rotatable arm portion having a first end attached to the rotatable column assembly and a second end attached to the swing out seat;

the swing out seat being stowed below the desktop when not in use and being deployed into a passenger door area of the aircraft when in use during flight and being deployed into a stowed position below the desktop and stowed to a side of the passenger door area of the aircraft when passengers board and disembark the aircraft, and further wherein the swing out seat comprises:

a locking mechanism to lock the swing out seat in a stowed position below the desktop and a stop mechanism to stop the swing out seat at a deployed position when the swing out seat is in use; and, the seat portion comprising a back portion, a sitting portion, a padded seat cushion, a retractable lap belt assembly, and side portions;

stowing the aircraft video control station in the cabinet having one or more cabinet doors when passengers board the aircraft;

opening the one or more cabinet doors;

deploying the swing out seat into the passenger door area during flight;

deploying the swing out seat away from the passenger door area;

stowing the swing out seat; and, closing the one or more cabinet doors when passengers disembark.

* * * * *